United States Patent
Lee

(10) Patent No.: US 12,412,937 B2
(45) Date of Patent: Sep. 9, 2025

(54) BATTERY PACK, BATTERY RACK COMPRISING THE SAME AND ENERGY STORAGE SYSTEM

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 695 days.

(21) Appl. No.: 17/771,178

(22) PCT Filed: May 3, 2021

(86) PCT No.: PCT/KR2021/005569
§ 371 (c)(1),
(2) Date: Apr. 22, 2022

(87) PCT Pub. No.: WO2021/235738
PCT Pub. Date: Nov. 25, 2021

(65) Prior Publication Data
US 2022/0367928 A1    Nov. 17, 2022

(30) Foreign Application Priority Data

May 22, 2020 (KR) .................... 10-2020-0061807

(51) Int. Cl.
*H01M 10/44* (2006.01)
*H01M 10/42* (2006.01)
(Continued)

(52) U.S. Cl.
CPC ....... *H01M 10/443* (2013.01); *H01M 10/441* (2013.01); *H01M 10/482* (2013.01);
(Continued)

(58) Field of Classification Search
CPC ............. H01M 10/443; H01M 10/441; H01M 10/482; H01M 10/486; H01M 10/613;
(Continued)

(56) References Cited

U.S. PATENT DOCUMENTS 5,227,259 A    7/1993   Weaver et al.
9,385,399 B2 * 7/2016   Ryu ..................... H01M 10/42
(Continued)

FOREIGN PATENT DOCUMENTS

CA    3054014 A1 * 10/2018   ........ H01M 10/4257
CN    1047603987 A    5/2015
(Continued)

OTHER PUBLICATIONS

International Search Report (PCT/ISA/210) issued in PCT/KR2021/005569, dated Aug. 19, 2021.
(Continued)

*Primary Examiner* — Julian D Huffman
*Assistant Examiner* — John Ondrasik
(74) *Attorney, Agent, or Firm* — Birch, Stewart, Kolasch & Birch, LLP

(57) ABSTRACT

A battery pack includes at least one cell assembly including a plurality of battery cells, an energy consumer configured to discharge the at least one cell assembly when thermal runaway occurs in at least one of the plurality of battery cells, and a storage unit in which the energy consumer is received inside, and configured to discharge at least part of the energy consumer to outside when the energy consumer discharges the cell assembly.

16 Claims, 8 Drawing Sheets

(51) Int. Cl.
   *H01M 10/48* (2006.01)
   *H01M 10/613* (2014.01)
   *H01M 10/6567* (2014.01)
   *H01M 50/581* (2021.01)

(52) U.S. Cl.
   CPC ....... *H01M 10/486* (2013.01); *H01M 10/613* (2015.04); *H01M 10/6567* (2015.04); *H01M 50/581* (2021.01); *H01M 10/425* (2013.01); *H01M 2010/4271* (2013.01); *H01M 2200/10* (2013.01)

(58) Field of Classification Search
   CPC .......... H01M 10/6567; H01M 50/581; H01M 10/425; H01M 2010/4271; H01M 2200/10
   USPC ....................................... 320/136, 3
   See application file for complete search history.

(56) References Cited

U.S. PATENT DOCUMENTS

| | | | |
|---|---|---|---|
| 2003/0001578 A1* | 1/2003 | Lam | ........................ H01H 13/70 324/426 |
| 2010/0026242 A1 | 2/2010 | Forslöw | |
| 2013/0224574 A1 | 8/2013 | Favaretto | |
| 2013/0328392 A1 | 12/2013 | Desbois-Renaudin et al. | |
| 2015/0207133 A1 | 7/2015 | Holl et al. | |
| 2016/0114695 A1 | 4/2016 | Holgers et al. | |
| 2017/0133872 A1* | 5/2017 | Masuda | ............. H01M 10/4257 |
| 2018/0198294 A1* | 7/2018 | Sheeks | .............. H02J 7/007194 |
| 2019/0157636 A1* | 5/2019 | Miler | .................... H01M 50/30 |
| 2019/0299799 A1 | 10/2019 | Hinterberger et al. | |
| 2020/0036047 A1 | 1/2020 | Aikens et al. | |
| 2020/0036050 A1 | 1/2020 | Shimura et al. | |
| 2021/0226290 A1* | 7/2021 | Lee | ................... H01M 10/6566 |
| 2021/0296718 A1* | 9/2021 | Li | ....................... H02J 7/00309 |

FOREIGN PATENT DOCUMENTS

| | | |
|---|---|---|
| CN | 108299178 A | 1/2017 |
| CN | 207818832 U | 9/2018 |
| JP | 2010-515496 A | 6/2010 |
| JP | 5722251 B2 | 5/2015 |
| JP | 2018-524695 A | 8/2018 |
| JP | 6440116 B2 | 12/2018 |
| JP | 2020-17517 A | 1/2020 |
| KR | 10-2019-0071455 A | 6/2019 |
| KR | 10-2019-0077650 A | 7/2019 |
| KR | 10-2019-0135077 A | 12/2019 |
| WO | WO 2018/186496 A1 | 10/2016 |
| WO | WO 2018/129516 A2 | 7/2018 |

OTHER PUBLICATIONS

Extended European Search Report for European Application No. 21807849.1, dated Feb. 26, 2024.

* cited by examiner

BATTERY PACK, BATTERY RACK COMPRISING THE SAME AND ENERGY STORAGE SYSTEM

TECHNICAL FIELD

The present disclosure relates to a battery pack, a battery rack comprising the same and an energy storage system, and more particularly, to a battery pack with improved safety against thermal runaway of a plurality of battery cells.

The present application claims the benefit of Korean Patent Application No. 10-2020-0061807 filed on May 22, 2020 with the Korean Intellectual Property Office, the disclosure of which is incorporated herein by reference in its entirety.

BACKGROUND ART

Currently, commercially available secondary batteries include nickel cadmium batteries, nickel hydride batteries, nickel zinc batteries, lithium secondary batteries, etc., and among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery mainly uses lithium-based oxide and a carbon material for a positive electrode active material and a negative electrode active material respectively. The lithium secondary battery includes an electrode assembly including a positive electrode plate coated with the positive electrode active material, a negative electrode plate coated with the negative electrode active material and a separator interposed between, and a hermetically sealed packaging material or battery pouch case in which the electrode assembly is received together with an electrolyte solution.

More recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output. In particular, pouch-type secondary batteries are widely used in medium- and large-scale devices because they are easy to stack.

With the growing need for a large-capacity structure for use as an energy storage source, there is an increasing demand for a battery pack including a plurality of secondary batteries electrically connected in series and/or parallel, a battery module to receive the secondary batteries and a battery management system (BMS).

However, the battery pack or rack includes a plurality of battery modules, and when a fire or explosion occurs due to thermal runaway in any of the plurality of secondary batteries of each battery module, heat or flames may spread to adjacent secondary batteries, causing secondary fires or explosions, and accordingly, many efforts have been made to prevent secondary fires or explosions.

Accordingly, when thermal runaway occurs in any secondary battery of the battery pack or the battery rack, thermal runaway of the battery pack has been mitigated by cooling the battery pack or discharging stored electrical energy.

However, in the process of discharging the electrical energy stored in the battery pack, resistance heat of a resistor that consumes the electrical energy may cause damage to the internal components of the battery pack or increase the temperature of the plurality of secondary batteries, causing thermal runaway of the secondary battery or impeding the cooling of the plurality of secondary batteries.

DISCLOSURE

Technical Problem

The present disclosure is designed to solve the above-described problem, and therefore the present disclosure is directed to providing a battery pack with improved safety against thermal runaway of a plurality of battery cells.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery pack according to the present disclosure includes at least one cell assembly including a plurality of battery cells, an energy consumer configured to discharge the at least one cell assembly when thermal runaway occurs in at least one of the plurality of battery cells, and a storage unit in which the energy consumer is received inside, and configured to discharge at least part of the energy consumer to outside when the energy consumer discharges the at least one cell assembly.

Additionally, the storage unit may include a discharger configured to support the energy consumer in a direction opposite to a discharge direction of the energy consumer, and the discharger may be configured to melt by heat generated by the energy consumer to discharge at least part of the energy consumer to the outside.

Furthermore, the storage unit may include a discharge door which is closed to support in a direction opposite to a discharge direction of the energy consumer, and the discharge door may be configured to be released from a closed state and be opened when the thermal runaway occurs.

Additionally, the battery pack may further include a cooler including a refrigerant to cool the energy consumer discharged to the outside.

Further, the energy consumer may include a switch, and a resistor which is electrically connected to the at least one cell assembly by operation of the switch and configured to consume electrical energy stored in the at least one cell assembly.

Additionally, the switch may be configured to be turned on by a physical change made by the heat generated from the at least one cell assembly.

Furthermore, the battery pack may further include a sensor to sense the thermal runaway in the plurality of battery cells, and a control unit to output a control signal for turning on the switch to electrically connect the at least one cell assembly to the resistor when the control unit receives a signal notifying the thermal runaway from the sensor.

Additionally, the at least one cell assembly, the resistor and the switch may be interconnected by an electrical line, and the electrical line may have a coil shape.

Furthermore, the at least one cell assembly may include at least two cell assemblies, and the energy consumer may be configured to discharge a first cell assembly including the battery cell in which the thermal runaway occurred among the at least two cell assemblies or a second cell assembly among the at least two cell assemblies adjacent to the first cell assembly.

Further, to achieve the above-described object, a battery rack according to the present disclosure includes a battery pack and a rack case in which the battery pack is received.

Additionally, to achieve the above-described object, an energy storage system according to the present disclosure includes at least one battery rack.

Advantageous Effects

According to an aspect of the present disclosure, the battery pack of the present disclosure includes the energy consumption unit and the storage unit, thereby preventing propagation of thermal runaway to the adjacent other battery cell or the other cell assembly when thermal runaway occurs in any of the plurality of battery cells. Further, the present disclosure may discharge the energy consumption unit out of the storage unit, thereby preventing the temperature rise of the component of the battery pack, for example, the other cell assembly caused by the resistance heat generated from the energy consumption unit. Further, the energy consumption unit discharged out of the storage unit may be cooled quickly when meeting the external air, thereby preventing damage to an external device by the heat of the energy consumption unit.

Additionally, according to an aspect of an embodiment of the present disclosure, the battery pack of the present disclosure includes the discharge unit configured to melt away by the heat generated by the energy consumption unit to discharge at least part of the energy consumption unit to the outside, thereby inducing the energy consumption unit to be spontaneously discharged to the outside using the resistance heat generated from the energy consumption unit without a separate discharge device. Accordingly, due to the simple configuration, it is possible to save the manufacturing cost and effectively reduce the malfunction likelihood.

Further, according to another aspect of the present disclosure, the battery pack of the present disclosure includes the coil shaped electrical line, thereby reducing impacts caused by a fall of the resistor using the elastic force of the coil shape when the resistor is discharged out of the storage unit. Accordingly, it is possible to prevent the coil shaped electrical line of the present disclosure from being cut when a force of the falling resistor is transmitted to the electrical line.

BRIEF DESCRIPTION OF THE DRAWINGS

The accompanying drawings illustrate preferred embodiments of the present disclosure and, together with the detailed disclosure, serve to provide further understanding of the technical spirit of the present disclosure. However, the present disclosure is not to be construed as being limited to the drawings.

DETAILED DESCRIPTION

Figure 1:
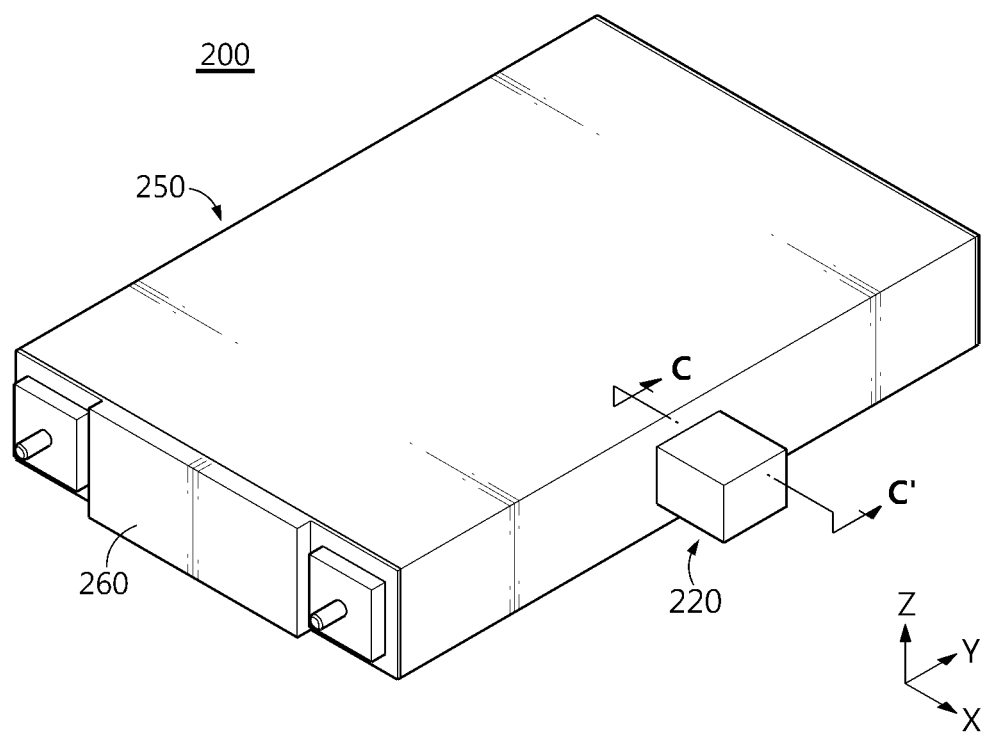
FIG. 1 is a schematic perspective view of a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
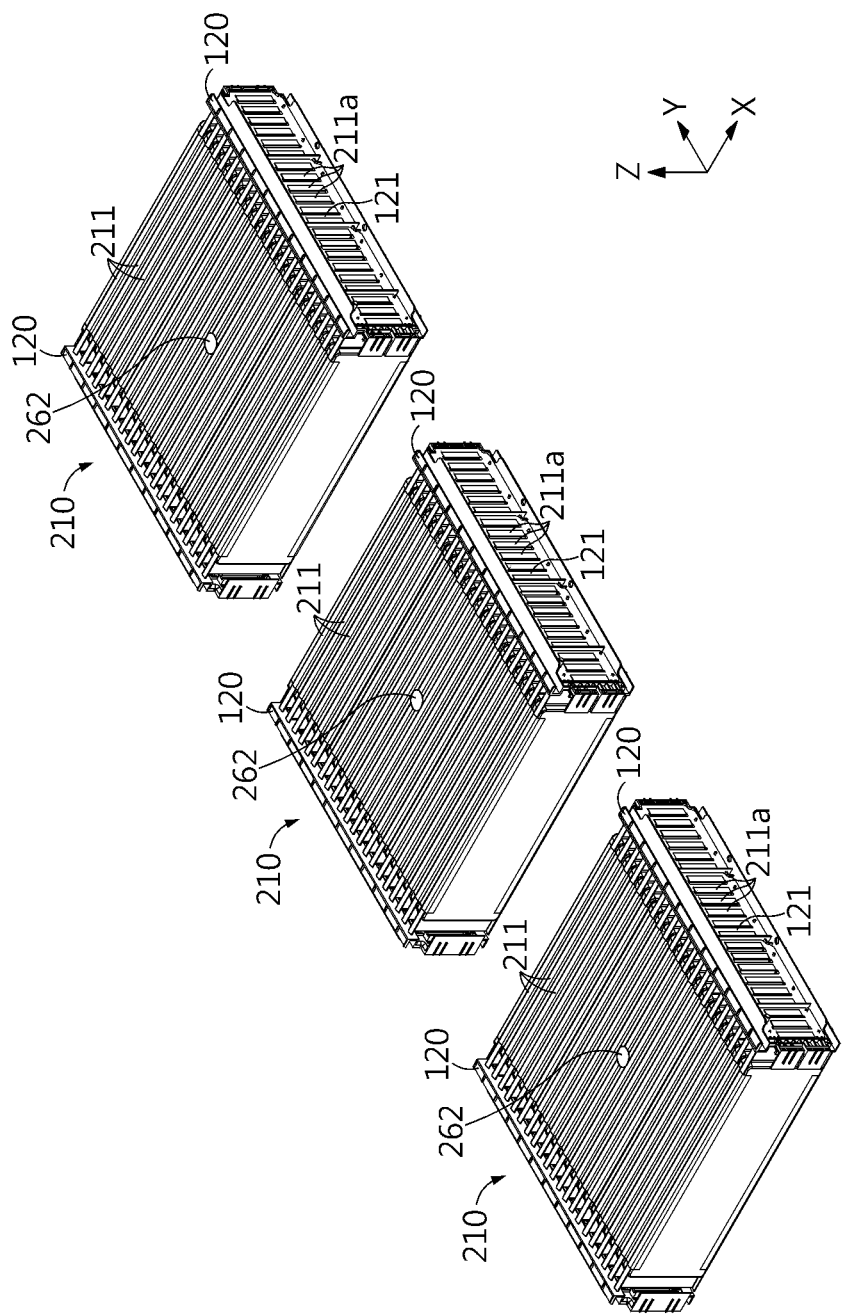
FIG. 2 is a schematic perspective view of cell assemblies of a battery pack according to an embodiment of the present disclosure.
Figure 3:
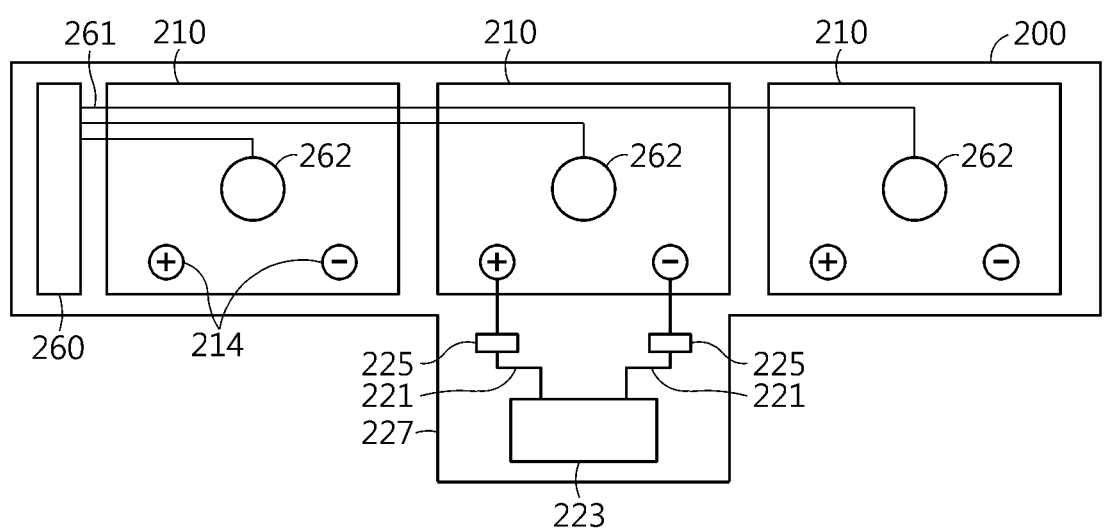
FIG. 3 is a schematic conceptual diagram showing components of a battery pack according to an embodiment of the present disclosure.

FIG. 1 is a schematic perspective view of a battery pack according to an embodiment of the present disclosure. FIG. 2 is a schematic perspective view of cell assemblies of the battery pack according to an embodiment of the present disclosure. Additionally, FIG. 3 is a schematic conceptual diagram showing the components of the battery pack according to an embodiment of the present disclosure. In FIG. 1, the X axis direction is the right direction, the Y axis direction is the rear direction, and the Z axis direction is the up direction.

Referring to FIGS. 1 to 3, the battery pack 200 according to the present disclosure may include at least one cell assembly 210 including a plurality of battery cells 211, an energy consumption unit 220 and a storage unit 227.

Specifically, the battery cell 211 may be a pouch-type battery cell 211. For example, as shown in FIG. 2, each of three cell assemblies 210 may include 21 pouch-type battery cells 211 stacked side by side in the front-rear direction (y direction).

In particular, the pouch-type battery cell 211 may include an electrode assembly (not shown), an electrolyte solution (not shown) and a pouch.

Further, as shown in FIG. 2, the battery cell 211 may have an electrode terminal 211a at two opposite ends (in the X direction) with respect to the center of the battery cell 211. For example, as shown in FIG. 2, each battery cell 211 of the cell assembly 210 may have a positive electrode terminal 211a and a negative electrode terminal (not shown) extending in the horizontal direction (X direction).

However, the battery pack 200 according to the present disclosure is not limited to the above-described pouch-type battery cell 211 and may employ various types of battery cells 211 known at the time of filing the patent application.

Additionally, the battery pack 200 may include at least one busbar 121 configured to electrically connect the plurality of battery cells 211 and at least two busbar frames 120 configured to mount the at least one busbar 121 on the outer side. The at least two busbar frames 120 may be provided on the left and right sides (X direction) of the cell assembly 210 respectively.

Specifically, the busbar 121 may include a conductive metal, for example, copper, aluminum and nickel.

Additionally, the busbar frame 120 may include an electrically insulating material. For example, the busbar frame 120 may include a plastic material. More specifically, the plastic material may be polyvinyl chloride.

Meanwhile, the battery pack 200 may include a pack housing 250. The pack housing 250 may have an internal space in which the at least one cell assembly 210 is received. For example, the pack housing 250 may accommodate three cell assemblies 210.

Meanwhile, when thermal runaway occurs in at least one of the plurality of battery cells 211, the energy consumption unit 220 may be configured to discharge the at least one cell assembly 210. That is, the energy consumption unit 220 may be electrically connected to a power terminal 214 (a positive power terminal and a negative power terminal) of the cell assembly 210 to intentionally cause an electrical short circuit. Accordingly, the power of the cell assembly 210 electrically connected to the energy consumption unit 220 may be consumed quickly. In other words, the energy consumption unit 220 may be configured to consume electrical energy of the cell assembly 210 quickly.

Here, the 'thermal runaway' refers to a positive feedback that the temperature rise of any of the plurality of battery cells 211 increases the energy release rate of the battery cell 211 and the adjacent battery cell 211, and in turn, this will accelerate the temperature rise. For example, thermal runaway may occur at 230° C. or above, and the battery cell 211 may spontaneously ignite.

For example, the energy consumption unit 220 may be configured to apply power to the resistor 223, a power resistor or an electric motor to consume the power of the battery pack 200.

Additionally, the energy consumption unit 220 may include an electrical short circuit. The electrical short circuit may be a circuit electrically connected between the resistor 223 of the energy consumption unit 220 and the cell assembly 210. That is, both the external positive electrode terminal and the external negative electrode terminal of the cell assembly 210 may be electrically connected to the resistor 223 to cause an intentional electrical short circuit.

Further, the storage unit 227 may be configured to receive the energy consumption unit 220 inside. The storage unit 227 may have, for example, a rectangular box shaped frame. The energy consumption unit 220 may be positioned in the internal space of the rectangular box shaped frame 235. The storage unit 227 may be connected to the outer wall of the pack housing 250.

For example, the storage unit 227 may have an open part so that the storage unit 227 is in communication with the inside of the pack housing 250. However, the storage unit 227 is not limited thereto, and may not be in communication with the inside of the pack housing 250. That is, the storage unit 227 may have a space that is isolated from the outside.

Additionally, when the energy consumption unit 220 discharges the cell assembly 210, the storage unit 227 may be configured to discharge at least part of the energy consumption unit 220 to the outside. That is, when the energy consumption unit 220 discharges the cell assembly 210, a part of the storage unit 227 may be open so that the energy consumption unit 220 moves to the outside.

According to this configuration of the present disclosure, the present disclosure includes the energy consumption unit 220 and the storage unit 227, thereby preventing propagation of thermal runaway to the adjacent other battery cell 211 or the other cell assembly 210 when thermal runaway occurs in any of the plurality of battery cells 211. Further, the present disclosure may discharge the energy consumption unit 220 out of the storage unit 227, thereby preventing the temperature rise of the component of the battery pack 200, for example, the other cell assembly 210 caused by the resistance heat generated from the energy consumption unit 220. Further, the energy consumption unit 220 discharged out of the storage unit 227 may be cooled quickly when meeting the external air, thereby preventing damage to an external device by the heat of the energy consumption unit 220.

Figure 4:
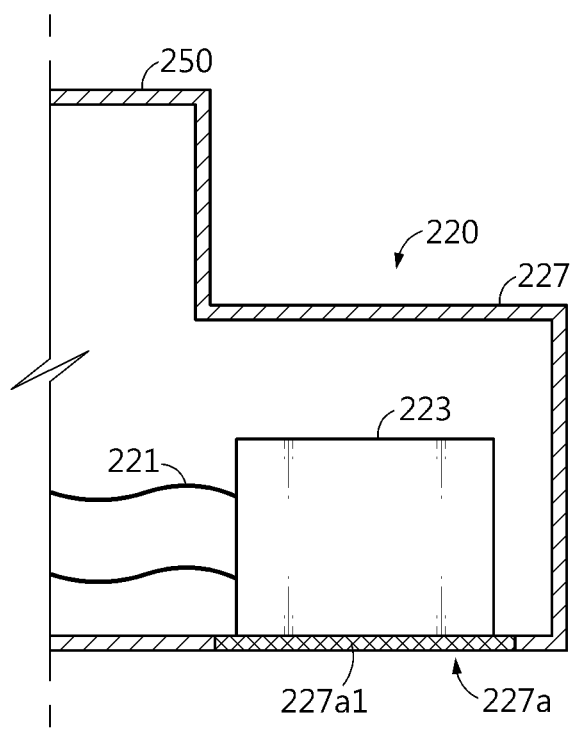
FIG. 4 is a schematic cross-sectional view of the battery pack of FIG. 1, taken along the line C-C'.

FIG. 4 is a schematic cross-sectional view showing the internal configuration of the components of the battery pack according to an embodiment of the present disclosure. Additionally, FIG. 5 is a schematic cross-sectional view showing the internal configuration of the components of the battery pack according to an embodiment of the present disclosure.

Figure 5:
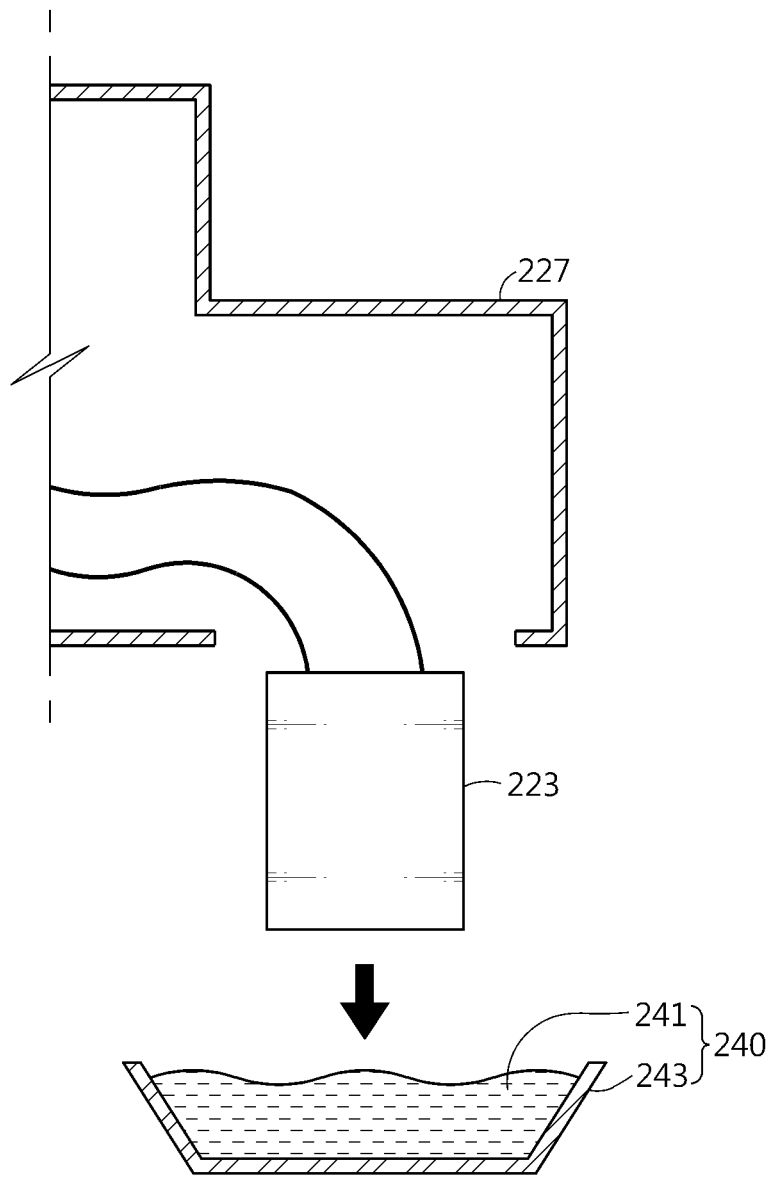
FIG. 5 is a schematic cross-sectional view showing the internal configuration of components of a battery pack according to an embodiment of the present disclosure.

Referring to FIGS. 4 and 5 together with FIG. 2, the storage unit 227 may have one open side through which the storage unit 227 is in communication with the inside of the pack housing 250. An electrical line 221 may be provided to establish an electrical connection between the cell assembly 210 and the resistor 223 through the open side of the storage unit 227.

Further, the storage unit 227 may include a discharge unit 227a. The discharge unit 227a may be configured to support the energy consumption unit 220 in a direction opposite to the discharge direction of the energy consumption unit 220. For example, as shown in FIG. 4, the storage unit 227 may include the discharge unit 227a configured to support the bottom of the energy consumption unit 220 in the upward direction. That is, the discharge unit 227a may be configured to support the energy consumption unit 220 in a direction opposite to the gravitational direction to place the energy consumption unit 220 in the storage unit 227.

Additionally, the discharge unit 227a may be configured to melt away by the heat generated by the energy consumption unit 220 to discharge at least part of the energy consumption unit 220 to the outside. For example, the discharge unit 227a may include a material 227a1 that melts at the temperature between about 150° C. and 300° C. The material may be, for example, paraffin or metal. The metal may be, for example, tin or lead.

According to this configuration of the present disclosure, the present disclosure includes the discharge unit 227a configured to melt away by the heat generated by the energy consumption unit 220 to discharge at least part of the energy consumption unit 220 to the outside, thereby inducing the energy consumption unit 220 to be spontaneously discharged to the outside using the resistance heat generated from the energy consumption unit 220 without a separate discharge device. Accordingly, due to the simple configuration, it is possible to save the manufacturing cost and effectively reduce the malfunction likelihood.

Figure 6:
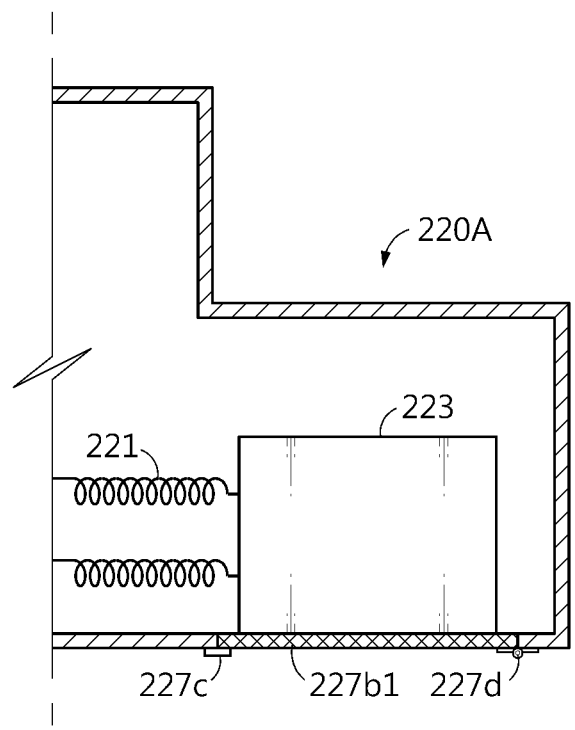
FIG. 6 is a schematic cross-sectional view showing the internal configuration of components of a battery pack according to another embodiment of the present disclosure.

FIG. 6 is a schematic cross-sectional view showing the internal configuration of the components of a battery pack according to another embodiment of the present disclosure. Additionally, FIG. 7 is a schematic cross-sectional view showing the internal configuration of the components of the battery pack according to another embodiment of the present disclosure.

Figure 7:
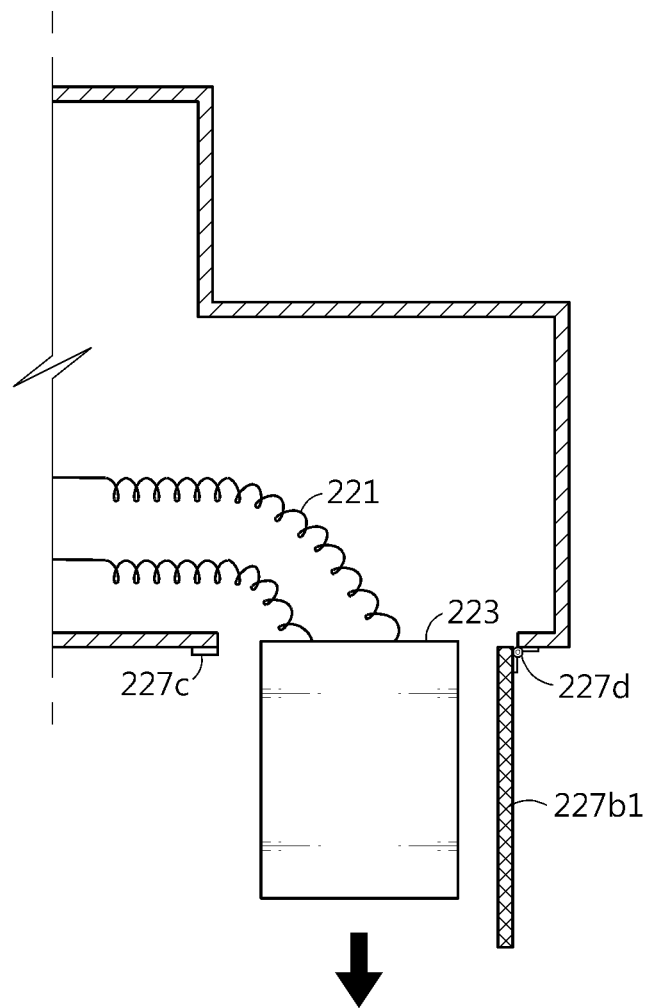
FIG. 7 is a schematic cross-sectional view showing the internal configuration of components of a battery pack according to another embodiment of the present disclosure.

Referring to FIGS. 6 and 7 together with FIG. 3, the storage unit 227 of the energy consumption unit 220A according to another embodiment of the present disclosure may include a discharge door 227b1. The discharge door 227b1 may be configured to support in a direction opposite to the discharge direction of the resistor 223 of the energy consumption unit 220A. The discharge door 227b1 may be closed to prevent the energy consumption unit 220A from being discharged. The discharge door 227b1 may be configured to be released from the closed state and be opened when thermal runaway occurs.

For example, the storage unit 227 may include a stop 227c and a hinge member 227d. The storage unit 227 may be configured to connect one side of the discharge door 227b1 of the hinge member 227d to the outer wall of the storage unit 227. That is, the discharge door 227b1 may be configured to rotatably move by the hinge member 227d. The stop 227c may be configured to keep the other side of the discharge door 227b1 from moving in the downward direction (gravitational direction).

That is, the stop 227c may be in the shape of a bar that extends in one direction. The stop 227c may be disposed on the outer wall (the lower wall) of the storage unit 227. The stop 227c may be configured to move in the extended lengthwise direction. The stop 227c may be configured to keep the discharge door 227b1 in the closed state or allow the discharge door 227b1 to rotatably move according to the location in the lengthwise direction.

Referring back to FIGS. 4 and 5, the battery pack 200 of the present disclosure may further include a cooling unit 240 configured to cool the energy consumption unit 220 discharged to the outside. For example, the cooling unit 240 may include a water tank 243 and a refrigerant 241 received in the water tank 243. The refrigerant 241 may be, for example, an insulating oil having an electrically insulating property and a high specific heat. When the energy consumption unit 220 is discharged from the storage unit 227, the cooling unit 240 may be configured to immerse the energy consumption unit 220 in the refrigerant 241 received in the water tank 243.

According to this configuration of the present disclosure, the present disclosure further includes the cooling unit 240, thereby safely storing the energy consumption unit 220 discharged from the storage unit 227. That is, since the energy consumption unit 220 may generate high temperature by consuming the power of the cell assembly 210, and when contacting with an external device or the user, may be damaged, the present disclosure may quickly cool and safely store the energy consumption unit 220 using the cooling unit 240.

Referring back to FIGS. 1 to 4, the energy consumption unit 220 of the present disclosure may include an electrical line 221, a resistor 223 and a switch 225.

Specifically, the electrical line 221 may be electrically connected to the power terminal 214 of the at least one cell assembly 210. The power terminal 214 may be a negative power terminal or a positive power terminal. The cell assembly 210, the resistor 223 and the switch 225 may be interconnected by the electrical line 221. The electrical line 221 may include a metal wire and an electrically insulating coating that covers the wire.

Additionally, the resistor 223 may be electrically connected to the electrical line 221 and configured to consume the stored electrical energy of the cell assembly 210. For example, the resistor 223 may include carbon, a metal or an oxidized metal having a predetermined specific electrical resistance or above. The metal may be, for example, alloys of copper, aluminum and nickel.

Further, the resistor 223 may be electrically connected to the positive electrode terminal and the negative electrode terminal of the cell assembly 210 to cause an electrical short circuit. The resistor 223 may be configured to convert the power of the cell assembly 210 into resistance heat.

Additionally, the switch 225 may be configured to control the electrical connection between the at least one cell assembly 210 and the resistor 223 by the on-off operation. The switch 225 may be provided on the electrical line 221. For example, as shown in FIG. 1, two switches 225 may be provided on two electrical lines 221 respectively. When comparing with inclusion of one switch 225, in case that the two switches 225 are provided, it is possible to prevent unnecessary power consumption of the cell assembly 210 caused by malfunction of any of the switches 225. The switch 225 may be configured to control electrical connection between the cell assembly 210 and the resistor 223.

For example, the switch 225 is in an off state, the switch 225 may be open to disallow the electricity of the electrical line 221 to flow, and when the switch 225 is in an on state, the switch 225 may be closed to allow the electricity of the electrical line 221 to flow.

Further, the switch 225 may be configured to be turned on by a physical change made by the influence of the heat generated from the cell assembly 210. For example, the switch 225 may be a temperature switch which opens or closes a contact point in response to the temperature using displacement resulting from expansion and contraction of a temperature sensing body such as bimetal with the temperature change of the cell assembly 210.

According to this configuration of the present disclosure, the present disclosure includes the switch 225 which opens or closes the contact point in response to the temperature, so the switch 225 may operate using the temperature change of the cell assembly 210 without a separate device for controlling the switch 225. Accordingly, due to the simple configuration of the battery pack 200, it is possible to save the manufacturing cost and effectively reduce the malfunction likelihood.

Referring back to FIGS. 1 to 4, the battery pack 200 of the present disclosure may further include a sensor 262 and a control unit 260. The sensor 262 may be a gas detection sensor or a temperature sensor configured to sense thermal runaway of the plurality of battery cells 211. For example, the sensor 262 may be disposed in the at least one cell assembly.

Additionally, when the control unit 260 receives a signal notifying thermal runaway from the sensor 262, the control unit 260 may be configured to transmit the signal to the switch 225 to electrically connect the cell assembly 210 to the resistor 223. The control unit 260 may include a communication line 261 to transmit the electrical signal to the switch 225. For example, when the control unit 260 receives the signal notifying thermal runaway from the sensor 262, the control unit 260 may be configured to output a control signal for turning on the switch 225.

According to this configuration of the present disclosure, the present disclosure further includes the control unit 260, thereby automatically controlling the switch 225 quickly when thermal runaway of the plurality of battery cells 211 is sensed. Accordingly, the present disclosure may quickly consume the power of the cell assembly 210 in which thermal runaway occurred, thereby increasing the safety.

Referring back to FIGS. 6 and 7, when comparing with the energy consumption unit 220 of FIG. 4, the battery pack 200 according to another embodiment of the present disclosure may include the electrical line 221 of a different shape. For example, as shown in FIG. 7, the electrical line 221 of the energy consumption unit 220 may be in the shape of a coil. When the resistor 223 is discharged out of the storage unit 227, the lengths of the coil shaped electrical line 221 may be elastically extended in the downward direction.

According to this configuration of the present disclosure, the present disclosure includes the coil shaped electrical line 221, thereby reducing impacts caused by a fall of the resistor 223 using the elastic force of the coil shape when the resistor 223 is discharged out of the storage unit 227. Accordingly, it is possible to prevent the coil shaped electrical line 221 of the present disclosure from being cut when a force of the falling resistor 223 is transmitted to the electrical line 221.

Referring back to FIGS. 1 to 4, the battery pack 200 of the present disclosure may include at least two cell assemblies 210. For example, as shown in FIG. 2, the battery pack 200 may include three cell assemblies 210.

Additionally, the energy consumption unit 220 may be configured to discharge the cell assembly 210 including the battery cell 211 in which thermal runaway occurred among the at least two cell assemblies 210.

Further, the energy consumption unit 220 may be configured to discharge the other cell assembly 210 adjacent to the cell assembly 210 including the battery cell 211 in which thermal runaway occurred among the at least two cell assemblies 210.

According to this configuration of the present disclosure, the present disclosure includes the energy consumption unit 220 configured to discharge the cell assembly 210 including the battery cell 211 in which thermal runaway occurred among the at least two cell assemblies 210, or configured to discharge the other cell assembly 210 adjacent to the cell assembly 210 including the battery cell 211 in which thermal runaway occurred among the at least two cell assemblies 210, thereby preventing propagation of thermal runaway from the cell assembly 210 to the adjacent other cell assembly 210 by consuming the power of the cell assembly 210 in which thermal runaway occurred or the cell assembly 210 adjacent to the cell assembly 210 in which thermal runaway occurred without needing to include the energy consumption unit 220 for each of the plurality of cell assemblies 210.

That is, when thermal runaway occurs in one of the plurality of cell assemblies 210, propagation of the thermal runaway to the adjacent other cell assembly 210 may be prevented by two methods. One of the methods quickly consumes the power of the cell assembly 210 including the battery cell 211 in which thermal runaway occurred among three cell assemblies 210, for example, below 30% as shown in FIG. 3. The fast power consumption may reduce the thermal energy level of the cell assembly 210 in which thermal runaway occurred to a level at which the thermal runaway may not spread to the adjacent other cell assembly 210, thereby preventing the propagation of the thermal runaway to the other cell assemblies disposed at the front end and the rear end.

Additionally, the other method consumes the power of the front cell assembly 210 and the rear cell assembly 210 adjacent to the cell assembly 210 in which thermal runaway occurred among three cell assemblies. That is, when there are temperature rises of the other cell assemblies 210 disposed at the front end and the rear end by the intermediate cell assembly 210 in which thermal runaway occurred, the power of the other cell assemblies 210 has been already consumed, for example, below 30%, so thermal runaway is less likely to occur, thereby preventing the propagation of the thermal runaway.

Figure 8:
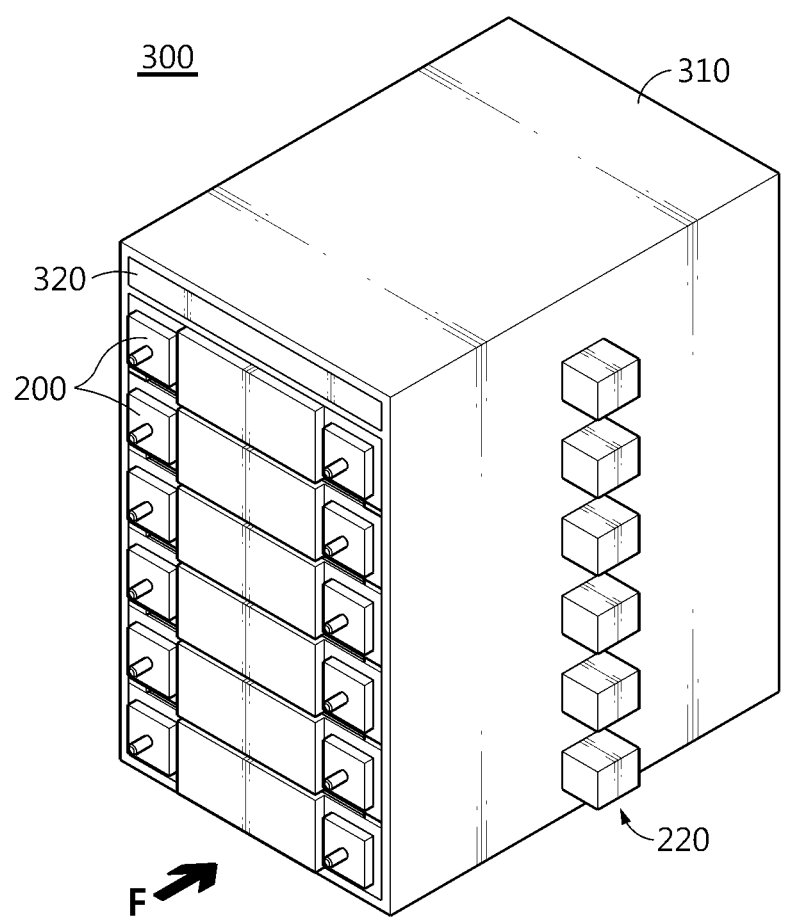
FIG. 8 is a schematic perspective view of a battery rack according to an embodiment of the present disclosure.

FIG. 8 is a schematic perspective view of a battery rack according to an embodiment of the present disclosure. For reference, in FIG. 8, up, down, left and right directions may be defined when the battery rack is viewed from the F direction.

Referring to FIG. 8, the battery rack 300 according to an embodiment of the present disclosure may include a rack case 310 that accommodates the plurality of battery packs 200. The rack case 310 may be configured to receive the plurality of battery packs 200 vertically stacked. In this instance, a part of the energy consumption unit 220 provided in each of the plurality of battery packs 200 may extend out of the rack case 310. That is, the energy consumption unit 220 may be disposed on the outer side of the battery rack 300 through a part of the rack case 310.

Further, the rack case 310 may be configured to be open to at least one side (right side). However, the rack case 310 may be configured to close the open side after the energy consumption unit 220 is installed.

Additionally, the battery rack 300 may further include a central control unit 320 including a Battery Management System (BMS) inside or outside of the rack case 310.

Meanwhile, an energy storage system (not shown) according to an embodiment of the present disclosure may include at least two battery racks 300. The at least two battery racks 300 may be arranged in a direction. For example, although not shown, the energy storage system may include three battery racks 300 arranged in a direction. The energy storage system may include a central control unit (not shown) to control the charge/discharge of the three battery racks 300.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

200: Battery pack
250: Pack housing 210: Cell assembly
211: Battery cell
220: Energy consumption unit
221, 223, 225: Electrical line, Resistor, Switch
227: Storage unit
227b, 227b1: Discharge unit, Discharge door
227c, 227d: Stop, Hinge member
240, 241, 243: Cooling unit, Refrigerant, Water tank
260, 261, 262: Control unit, Communication line, Sensor
300: Battery rack

What is claimed is:
1. A battery pack, comprising:
at least one cell assembly including a plurality of battery cells;

an energy consumer configured to receive power from the at least one cell assembly when thermal runaway occurs in at least one of the plurality of battery cells; and a storage unit in which the energy consumer is received inside, and configured to physically eject at least part of the energy consumer to outside when the energy consumer receives power from the at least one cell assembly.

2. The battery pack according to claim 1, wherein the storage unit includes a discharger configured to support the energy consumer in a direction opposite to a discharge direction of the energy consumer, and wherein the discharger is configured to melt by heat generated by the energy consumer to transfer at least part of the energy consumer to the outside.

3. The battery pack according to claim 1, wherein the storage unit includes a discharge door which is closed to support in a direction opposite to a discharge direction of the energy consumer, and wherein the discharge door is configured to be released from a closed state and be opened when the thermal runaway occurs.

4. The battery pack according to claim 1, further comprising:

a cooler including a refrigerant to cool the energy consumer ejected to the outside.

5. The battery pack according to claim 1, wherein the energy consumer includes:

a switch; and a resistor which is electrically connected to the at least one cell assembly by operation of the switch and configured to consume electrical energy stored in the at least one cell assembly.

6. The battery pack according to claim 5, wherein the switch is configured to be turned on by a physical change made by the heat generated from the at least one cell assembly.

7. The battery pack according to claim 5, further comprising:

a sensor to sense the thermal runaway in the plurality of battery cells; and a control unit to output a control signal for turning on the switch to electrically connect the at least one cell assembly to the resistor when the control unit receives a signal notifying the thermal runaway from the sensor.

8. The battery pack according to claim 5, wherein the at least one cell assembly, the resistor and the switch are interconnected by an electrical line, and wherein the electrical line has a coil shape.

9. The battery pack according to claim 1, wherein the at least one cell assembly includes at least two cell assemblies, and wherein the energy consumer is configured to receive power from a first cell assembly including the battery cell in which the thermal runaway occurred among the at least two cell assemblies or a second cell assembly among the at least two cell assemblies adjacent to the first cell assembly.

10. A battery rack, comprising:

the battery pack according to claim 1, and a rack case in which the battery pack is received.

11. An energy storage system comprising at least two battery racks according to claim 10.

12. The battery pack according to claim 1, wherein the at least one cell assembly includes a first cell assembly, a second cell assembly and a third cell assembly, the second cell assembly being between the first cell assembly and the third cell assembly, and wherein the energy consumer is connected to the second cell assembly.

13. The battery pack according to claim 12, wherein the energy consumer is connected to the second cell assembly by wires, and wherein the wires include at least one switch.

14. The battery pack according to claim 13, wherein the energy consumer is connected to a positive terminal and a negative terminal of the second cell assembly.

15. The battery pack according to claim 14, wherein the at least one switch comprises a first switch between the second cell assembly and the positive terminal and a second switch between the second cell assembly and the negative terminal.

16. The battery pack according to claim 13, wherein the at least one switch is activated by an elevated temperature.

\* \* \* \* \*